United States Patent
Kim et al.

(10) Patent No.: US 9,680,848 B2
(45) Date of Patent: Jun. 13, 2017

(54) APPARATUS, SYSTEM AND METHOD FOR DETECTING AND PREVENTING MALICIOUS SCRIPTS USING CODE PATTERN-BASED STATIC ANALYSIS AND API FLOW-BASED DYNAMIC ANALYSIS

(71) Applicant: Korea Internet & Security Agency, Seoul (KR)

(72) Inventors: Hwan Kuk Kim, Seoul (KR); Jong Hun Jung, Seoul (KR); Han Chul Bae, Seoul (KR); Hyun Rok Choo, Seoul (KR); Woung Jang, Gyeonggi-do (KR); Sang Hwan Oh, Gyeonggi-do (KR); Soo Jin Yoon, Daegu (KR)

(73) Assignee: Korea Internet & Security Agency, Seoul (KR)

( * ) Notice: Subject to any disclaimer, the term of this patent is extended or adjusted under 35 U.S.C. 154(b) by 0 days.

(21) Appl. No.: 14/913,900

(22) PCT Filed: Jan. 23, 2015

(86) PCT No.: PCT/KR2015/000746
§ 371 (c)(1),
(2) Date: Feb. 23, 2016

(87) PCT Pub. No.: WO2016/088937
PCT Pub. Date: Jun. 9, 2016

(65) Prior Publication Data
US 2016/0359875 A1  Dec. 8, 2016

(30) Foreign Application Priority Data
Dec. 3, 2014 (KR) .................. 10-2014-0172449

(51) Int. Cl.
*G06F 21/56* (2013.01)
*H04L 29/06* (2006.01)
*H04L 29/08* (2006.01)

(52) U.S. Cl.
CPC ........ *H04L 63/1416* (2013.01); *G06F 21/564* (2013.01); *G06F 21/566* (2013.01); *H04L 67/02* (2013.01)

(58) Field of Classification Search
CPC .................................................. G06F 21/566
See application file for complete search history.

(56) References Cited

U.S. PATENT DOCUMENTS

2007/0028110 A1* 2/2007 Brennan ............... G06F 21/552
                                                              713/176
2009/0313261 A1* 12/2009 Corella ................... H04L 63/08
(Continued)

FOREIGN PATENT DOCUMENTS

| KR | 1020110088042 | 8/2011 |
| KR | 1020110108491 | 10/2011 |
| KR | 1020120070025 | 6/2012 |

OTHER PUBLICATIONS

International Search Report and Written Opinion issued in counterpart International Application No. PCT/KR2015/000746 on Aug. 27, 2015.
(Continued)

*Primary Examiner* — William Powers
(74) *Attorney, Agent, or Firm* — Brian J. Colandreo; Michael T. Abramson; Holland & Knight LLP

(57) ABSTRACT

Provided are an apparatus, a system and a method for detecting and preventing malicious scripts. The apparatus for detecting and preventing malicious scripts includes a signature management unit managing a first signature including code pattern information of previously-detected malicious scripts, a script analysis unit receiving the first
(Continued)

signature from the signature management unit and analyzing a first script, which is included in a web page, using the first signature, and a script processing unit receiving analysis result data from the script analysis unit and processing the first script according to the analysis result data.

17 Claims, 20 Drawing Sheets

(56) References Cited

U.S. PATENT DOCUMENTS

| | | | | |
|---|---|---|---|---|
| 2011/0239294 A1* | 9/2011 | Kim | ...................... | G06F 21/566 |
| | | | | 726/22 |
| 2015/0347756 A1* | 12/2015 | Hidayat | .................. | G06F 21/57 |
| | | | | 726/22 |
| 2016/0094564 A1* | 3/2016 | Mohandas | ............ | G06F 21/563 |
| | | | | 726/24 |
| 2016/0094570 A1* | 3/2016 | Hunt | .................. | H04L 63/1416 |
| | | | | 726/24 |

OTHER PUBLICATIONS

J.W Park et al., "An Automatic Malware Classification System using String List and APIs", Journal of Security Engineering, vol. 8, No. 5, pp. 611-626, Oct. 2011 (See English Abstract p. 612).

\* cited by examiner

FIG. 10

| Classification | Api name | Metadata | Code location |
|---|---|---|---|
| Semantics | Api name information | Metadata input to api | Location information regarding location where api is detected |
| Format | [Api name] | [Metadata] | [Source ID : Position] |

FIG. 11

SOURCE ID : 1234          POSITION : 4231

DOCUMENT. WRITE('<SCRIPT>ALERT();</SCRIPT>');

Conversion⟶  [DOCUMENT.WRITE] [<SCRIPT>ALERT();</SCRIPT>] [1234 : 4231]

FIG. 12

Call trace xml configuration

| Classification | Root | Api name | Pn | Loc |
|---|---|---|---|---|
| Semantics | Root node of xml | Api name node | Api metadata node | Location information of node where api is detected |
| Format | <Root><br></Root> | <Api name><br></Api name> | <P1><P1><br><P2><P2>··· | <Loc></Loc> |

FIG. 13

[DOCUMENT.WRITE] [<SCRIPT>ALERT();</SCRIPT>] [1234 : 4231]

$\xrightarrow{\text{XML Conversion}}$

```
<ROOT>
    <DOCUMENT.WRITE>
        <P1>&lT; SCRIPT> ALERT();</SCRIPT></P1>
        <LOC> 1234 : 4231 </LOC>
    </DOCUMENT. WRITE>
</ROOT>
```

APPARATUS, SYSTEM AND METHOD FOR DETECTING AND PREVENTING MALICIOUS SCRIPTS USING CODE PATTERN-BASED STATIC ANALYSIS AND API FLOW-BASED DYNAMIC ANALYSIS

CROSS-REFERENCE TO RELATED APPLICATIONS

This application is a U.S. National Stage of International Patent Application No. PCT/KR2015/000746, filed Jan. 24, 2015, which claims priority to Korean Patent Application No: 10-201400172449, filed on Dec. 3, 2014 in the Korean Intellectual Property Office, the disclosure of which is incorporated herein by reference in its entirety.

BACKGROUND

1. Field of the Inventive Concept

The inventive concept relates to an apparatus, system and method for detecting and preventing malicious scripts using a code pattern-based static analysis and an Application Programming Interface (API) flow-based dynamic analysis.

2. Description of the Related Art

Malicious codes are codes created for causing an abnormal operation of a system or harming the system, and encompass computer viuses, worms, Trojan horses and the like. Malicious scripts are malicious programs written in a script language. Most of the malicious scripts discovered up to now are written in Visual Basic Script, mIRC script and JavaScript, and some of them are written in PHP script, Corel Draw Script and the like.

A signature-based scanning method is widely used to detect malicious scripts as well as binary malicious codes. However, this type of method can only detect malicious codes from which signatures are extracted by a thorough pre-analysis process. Accordingly, heuristic scanning, static analysis, behavior monitoring, etc. are generally used to detect new malicious scripts that are not known yet.

SUMMARY

Exemplary embodiments of the inventive concept provide an apparatus for detecting and preventing malicious scripts, which is capable of detecting malicious scripts from web pages in real time using code pattern information and Application Programming Interface (API) flow information of previously-detected malicious scripts.

Exemplary embodiments of the inventive concept also provide a system for detecting and preventing malicious scripts, which is capable of detecting malicious scripts from web pages in real time using code pattern information and API flow information of previously-detected malicious scripts.

Exemplary embodiments of the inventive concept also provide a method of detecting and preventing malicious scripts, which is capable of detecting malicious scripts from web pages in real time using code pattern information and API flow information of previously-detected malicious scripts.

However, exemplary embodiments of the inventive concept are not restricted to those set forth herein. The above and other exemplary embodiments of the inventive concept will become more apparent to one of ordinary skill in the art to which the inventive concept pertains by referencing the detailed description of the inventive concept given below.

According to an exemplary embodiment of the inventive concept, there is provided an apparatus for detecting and preventing malicious scripts including a signature management unit managing a first signature including code pattern information of previously-detected malicious scripts, a script analysis unit receiving the first signature from the signature management unit and analyzing a first script, which is included in a web page, using the first signature, and a script processing unit receiving analysis result data from the script analysis unit and processing the first script according to the analysis result data.

According to another exemplary embodiment of the inventive concept, there is provided a system for detecting and preventing malicious scripts including an apparatus for detecting and preventing malicious scripts, analyzing a first script, which is included in a web page, using a first signature or a second signature to determine whether a malicious script exists in the first script, and processing the first script according to analysis result data obtained by the analysis, and a signature management apparatus generating and managing the first signature or the second signature and providing the first signature or the second signature to the apparatus for detecting and preventing malicious scripts upon request, wherein the first signature includes code pattern information of previously-detected malicious scripts, the second signature includes a call trace, which has API flow information of the previously-detected malicious scripts, and the apparatus for detecting and preventing malicious scripts primarily performs static analysis on the first script using the first signature and secondarily performs dynamic analysis on the first script using the second signature.

According to still another exemplary embodiment of the inventive concept, there is provided a method of detecting and preventing malicious scripts including receiving analysis input data, extracting analysis type information from the analysis input data, performing static analysis or dynamic analysis on a first script, which is included in a web page, according to the extracted analysis type information, updating analysis result data according to results of the static analysis or the dynamic analysis, and removing or blocking the first script according to the results of the static analysis or the dynamic analysis, wherein the performing the static analysis or the dynamic analysis, comprises performing the static analysis on the first script using a first signature including code pattern information of previously-detected malicious scripts, or performing the dynamic analysis on the first script using a second signature including a call trace having API flow information of the previously-detected malicious scripts.

Other features and exemplary embodiments will be apparent from the following detailed description, the drawings, and the claims.

According to the exemplary embodiments, it is possible to detect malicious scripts from web pages in real time using code pattern information and API flow information of previously-detected malicious scripts.

BRIEF DESCRIPTION OF THE DRAWINGS

FIGS. 10 to 13 are diagrams illustrating the generation of an Application Programming Interface (API) trace and the Extensible Mark-up Language (XML) conversion of a call trace.

DETAILED DESCRIPTION OF THE EMBODIMENTS

Figure 1:
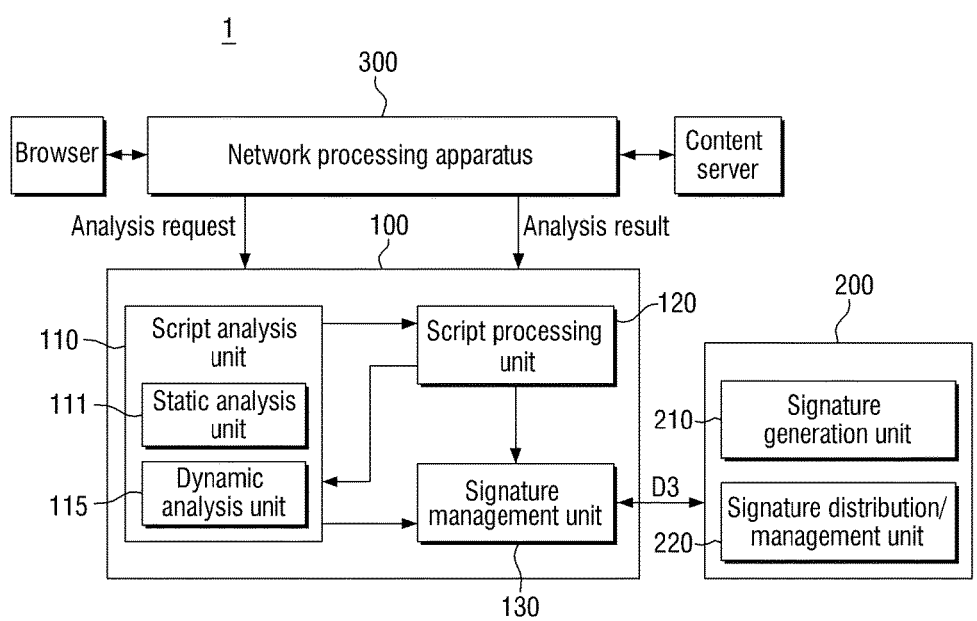
FIG. 1 is a block diagram of a system for detecting and preventing malicious scripts, according to an exemplary embodiment of the inventive concept.

Advantages and features of the inventive concept and methods of accomplishing the same may be understood more readily by reference to the following detailed description of exemplary embodiments and the accompanying drawings. The inventive concept may, however, be embodied in many different provides and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

Each block of each of the accompanying flowcharts may represent a module, segment, or portion of code, which comprises one or more executable instructions for implementing the specified logical function(s). It should be noted that in some alternative implementations, the functions noted in the blocks may occur out of the order set forth in the accompanying drawings. For example, two consecutive blocks shown in the accompanying flowcharts may in fact be executed substantially concurrently or the blocks may sometimes be executed in the reverse order, depending upon the functionality involved.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 2:
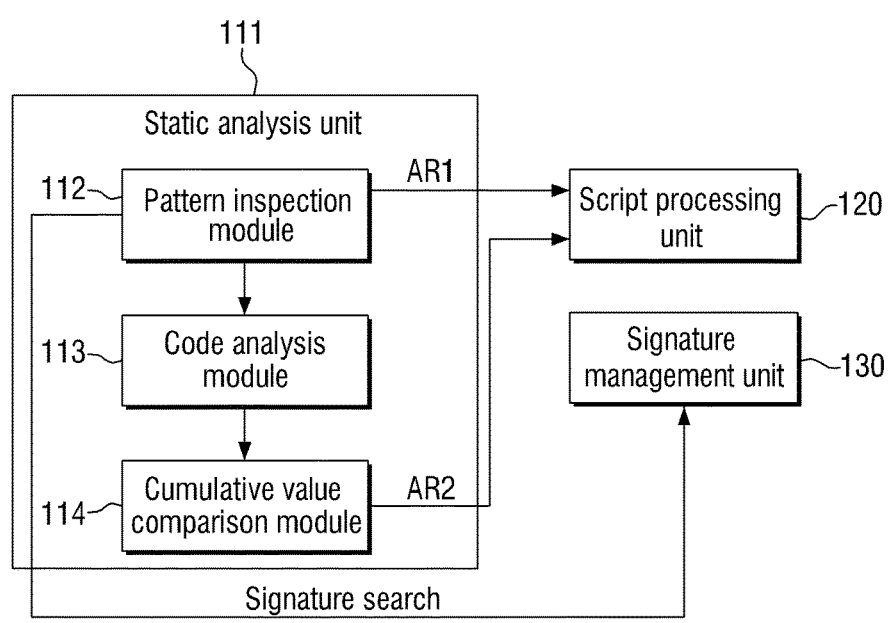
FIG. 2 is a block diagram of a static analysis unit illustrated in FIG. 1.
Figure 3:
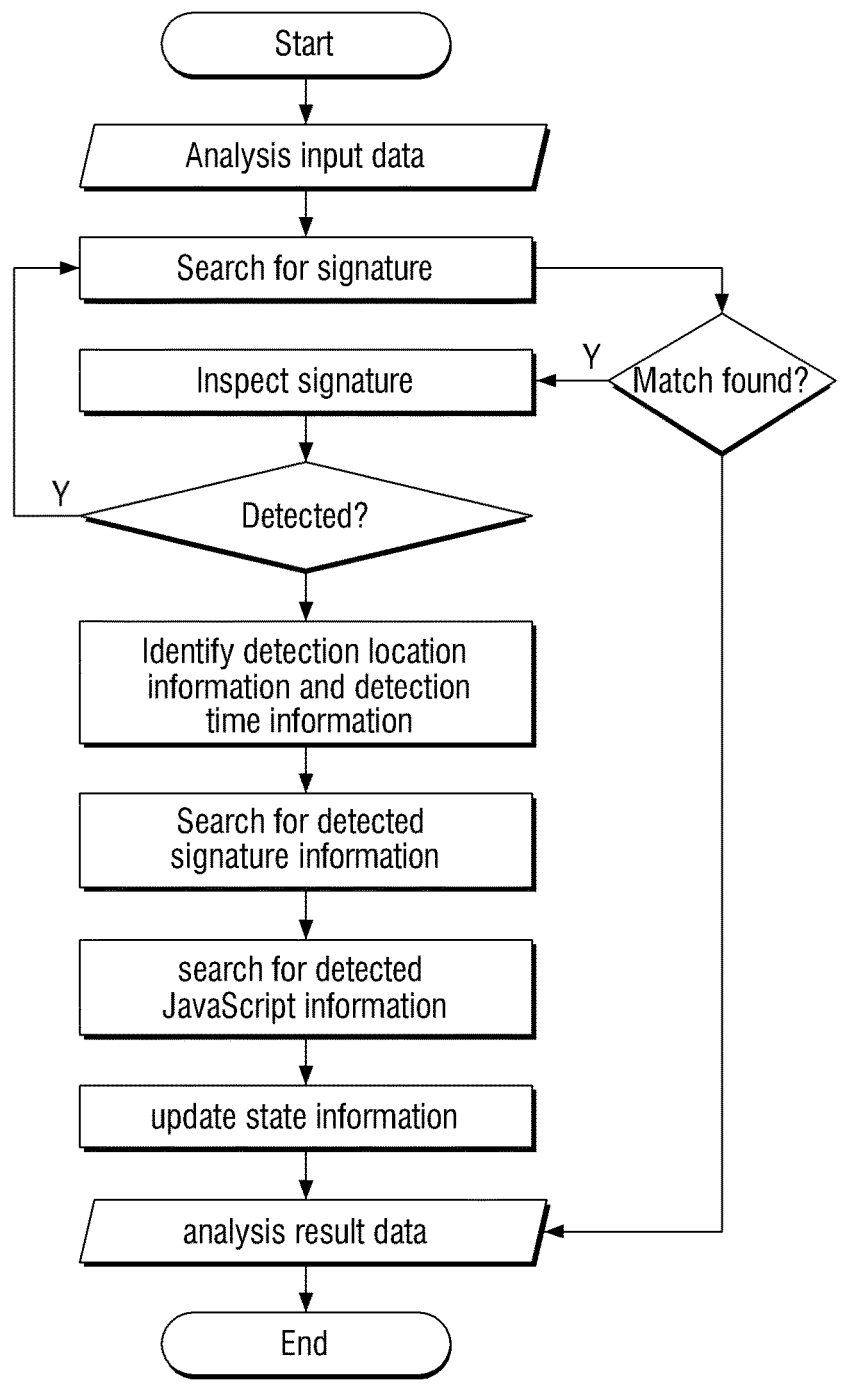
FIG. 3 is a flowchart illustrating an operation of a pattern inspection module included in the static analysis unit.
Figure 4:
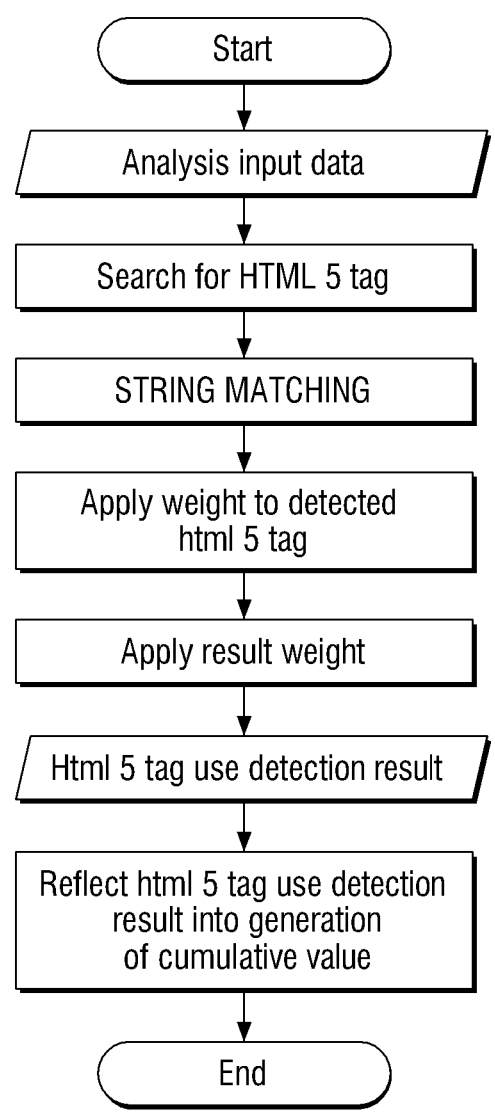
FIGS. 4 to 6 are flowcharts illustrating an operation of a code analysis module included in the static analysis unit.
Figure 5:
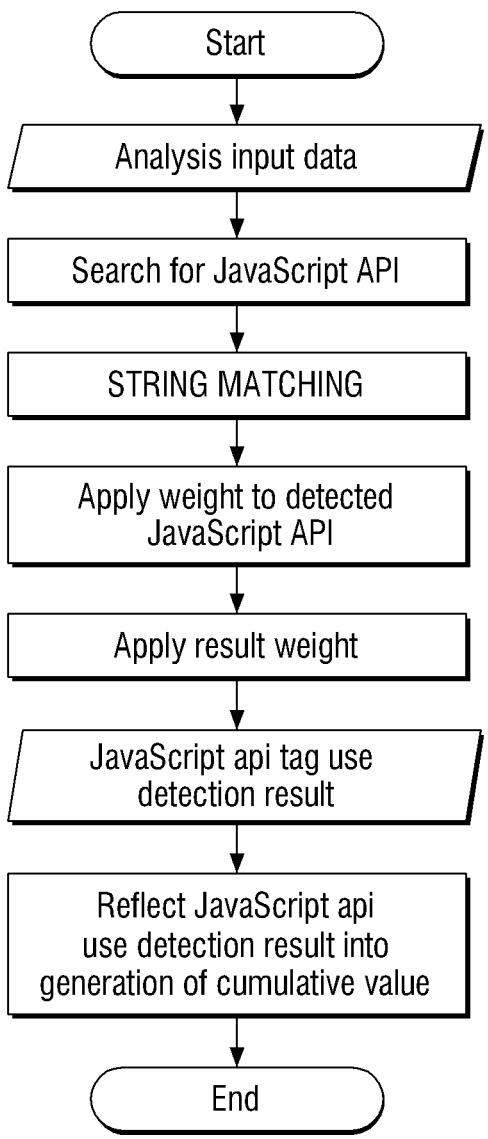
Figure 6:
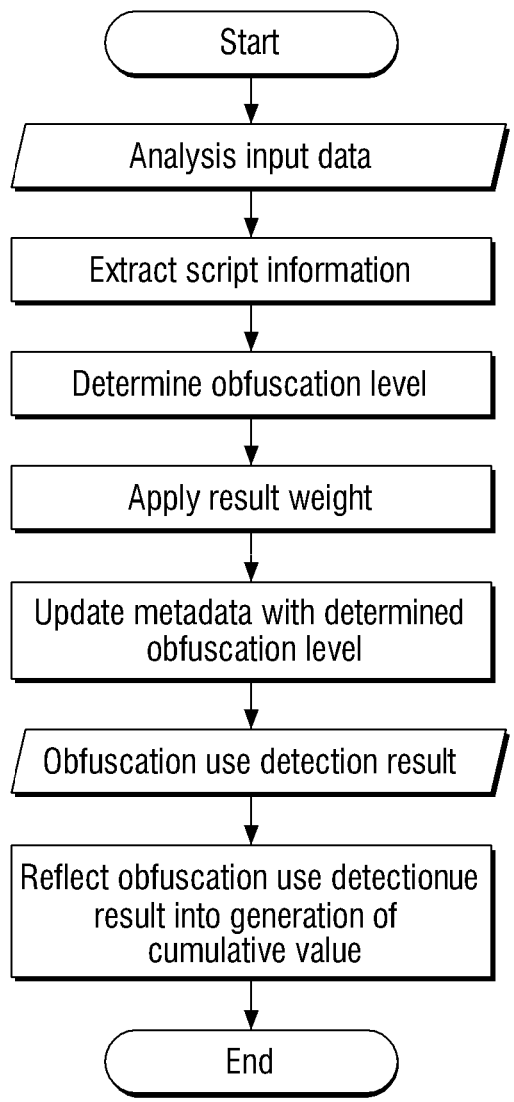
Figure 7:
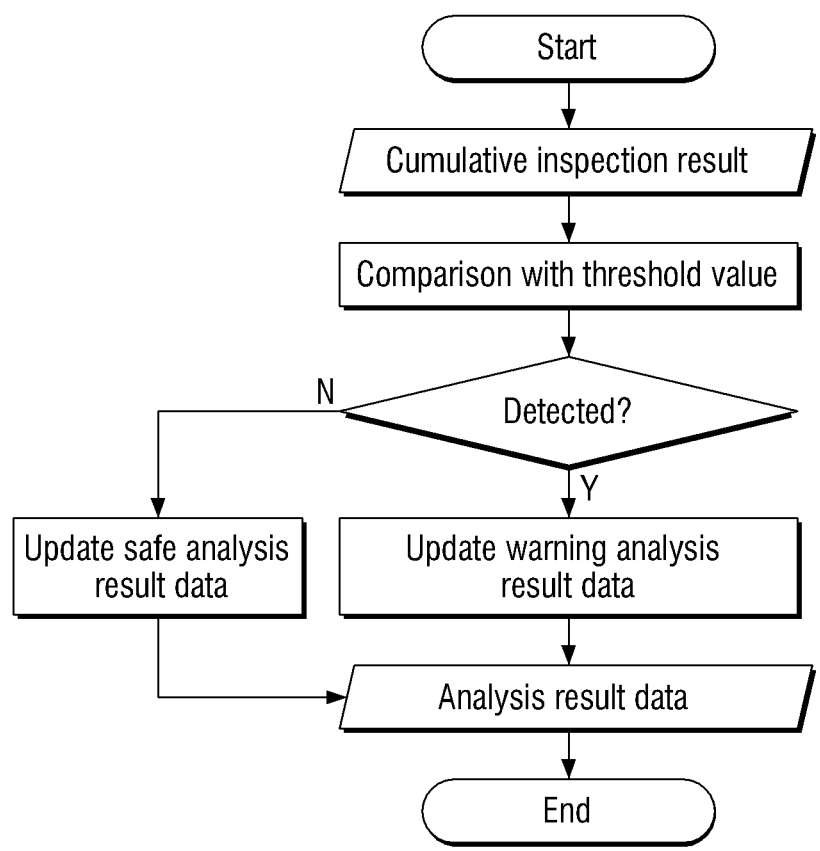
FIG. 7 is a flowchart illustrating an operation of a cumulative value comparison module included in the static analysis unit.
Figure 8:
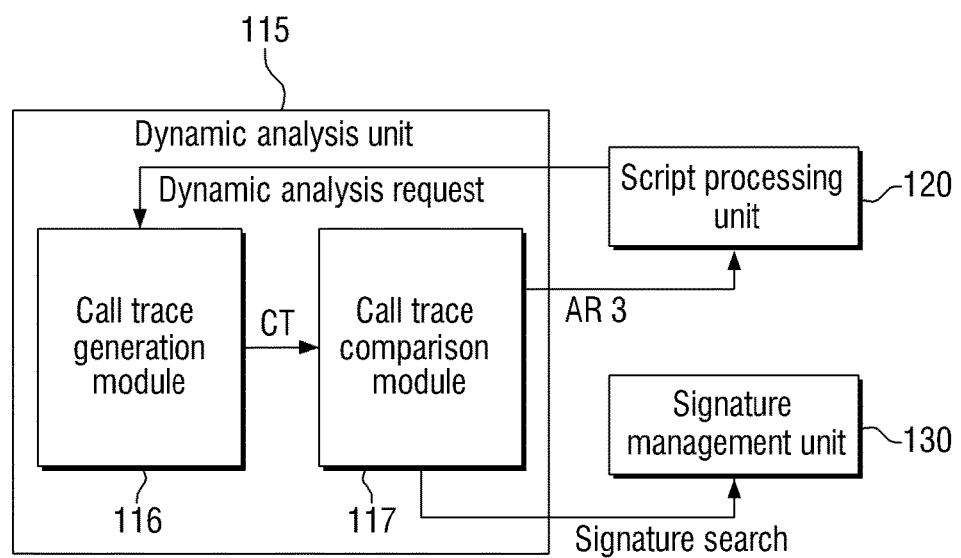
FIG. 8 is a block diagram of a dynamic analysis unit illustrated in FIG. 1.
Figure 9:
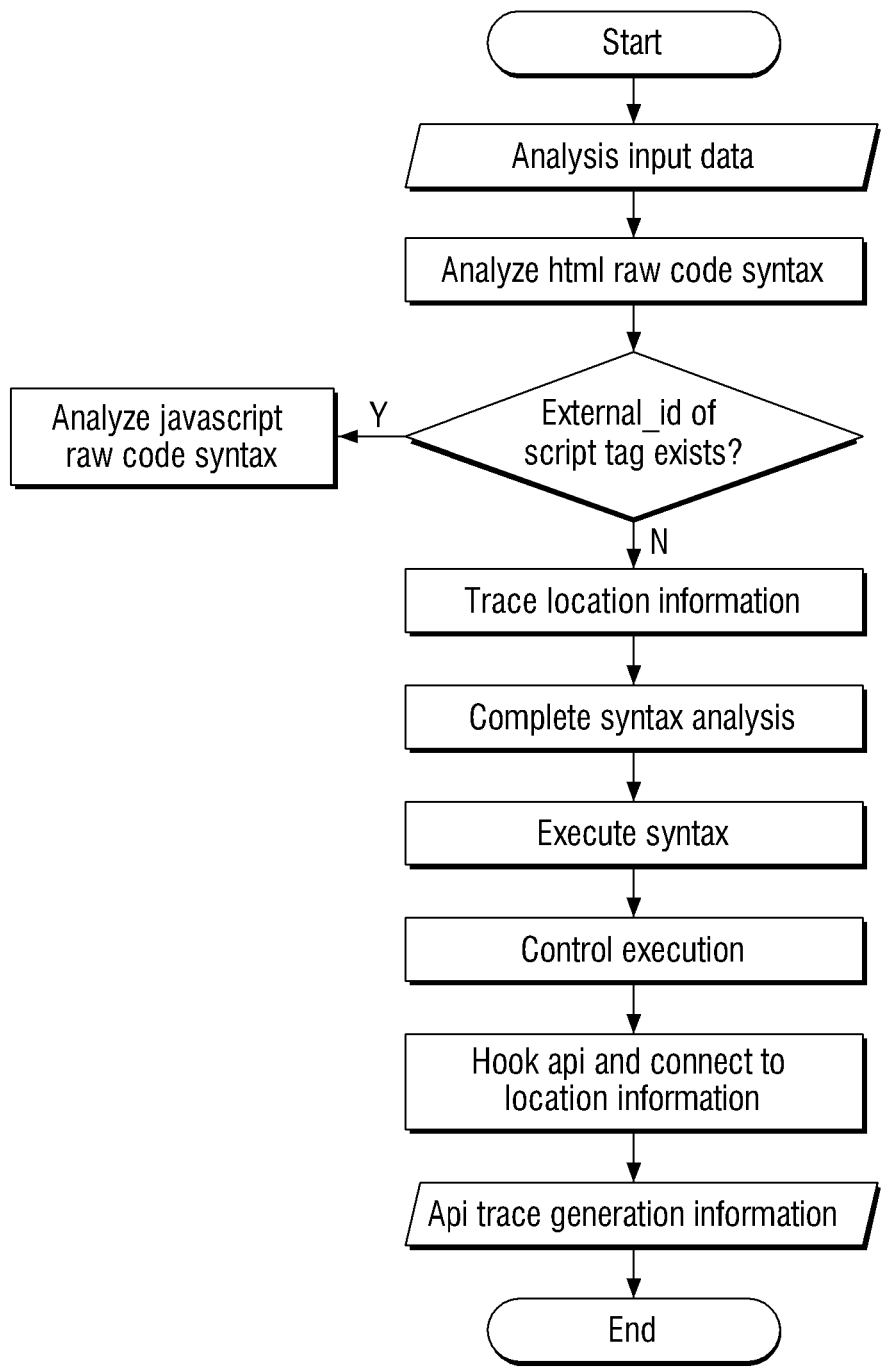
FIG. 9 is a flowchart illustrating an operation of a call trace generation module included in the dynamic analysis unit.
Figure 14:
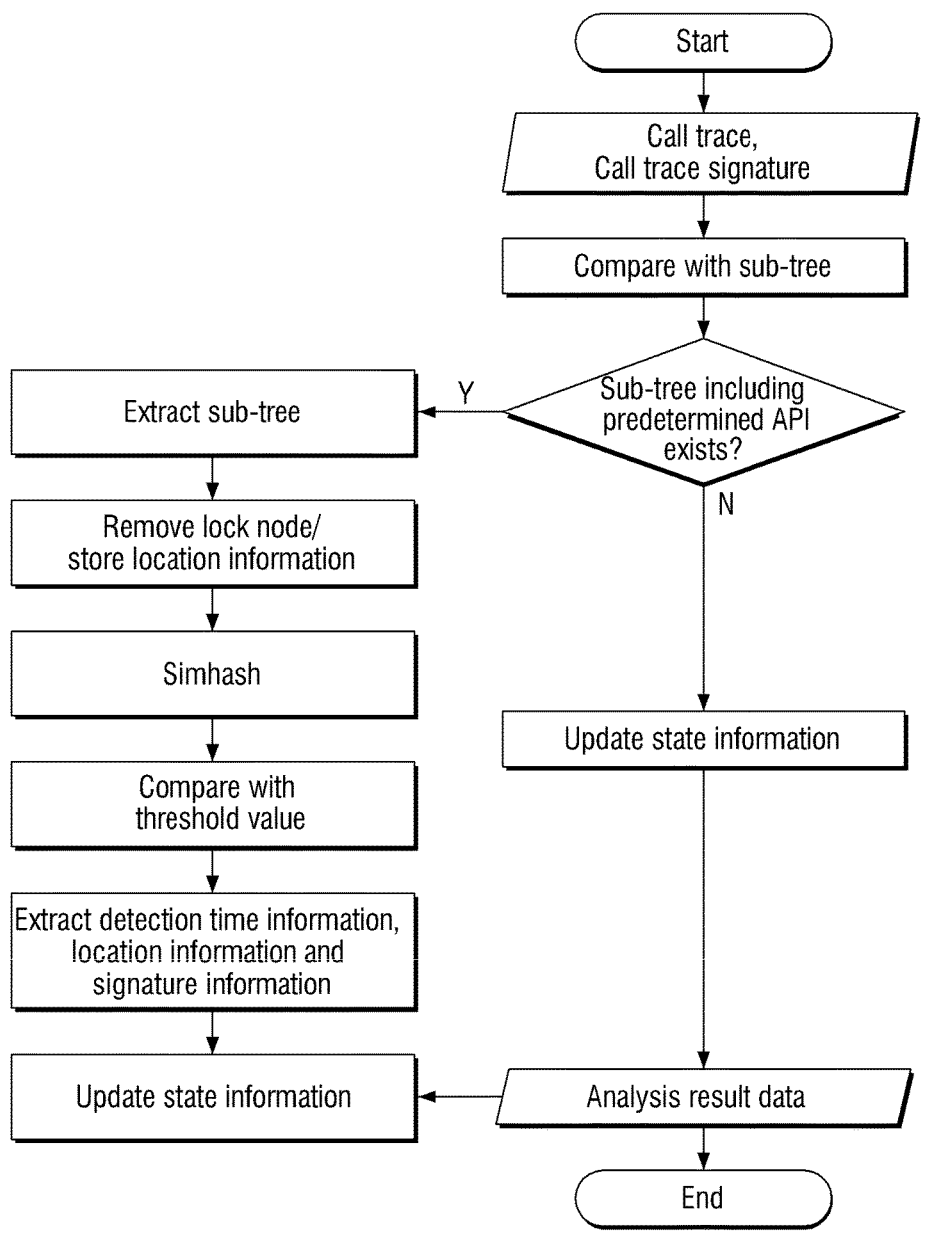
FIG. 14 is a flowchart illustrating an operation of a call trace comparison module included in the dynamic analysis unit.
Figure 15:
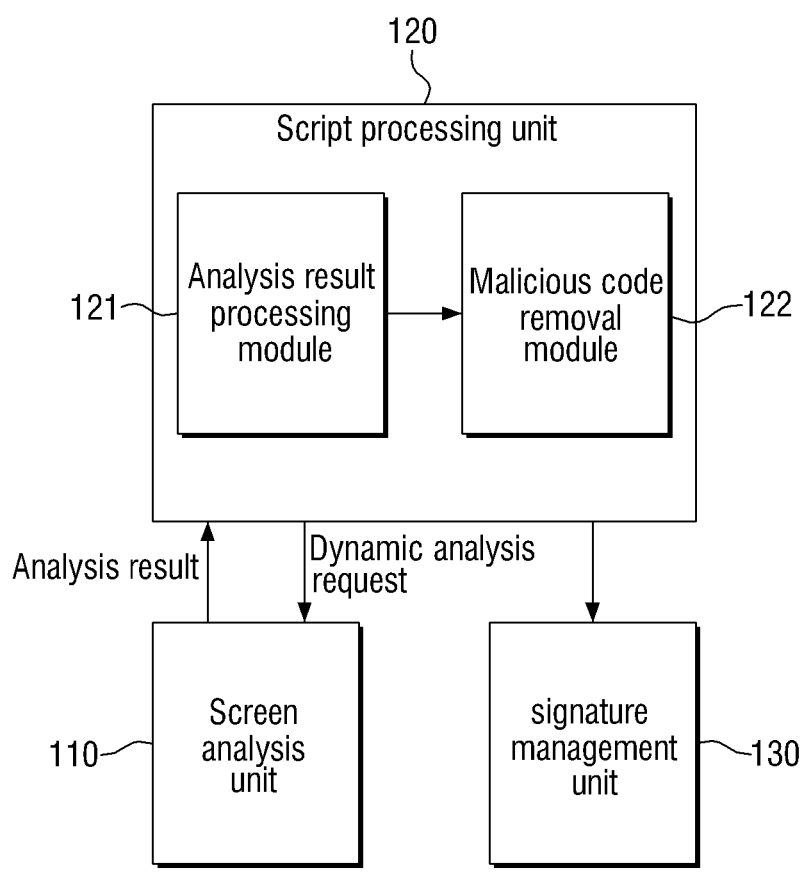
FIG. 15 is a block diagram illustrating a script processing unit illustrated in FIG. 1.
Figure 16:
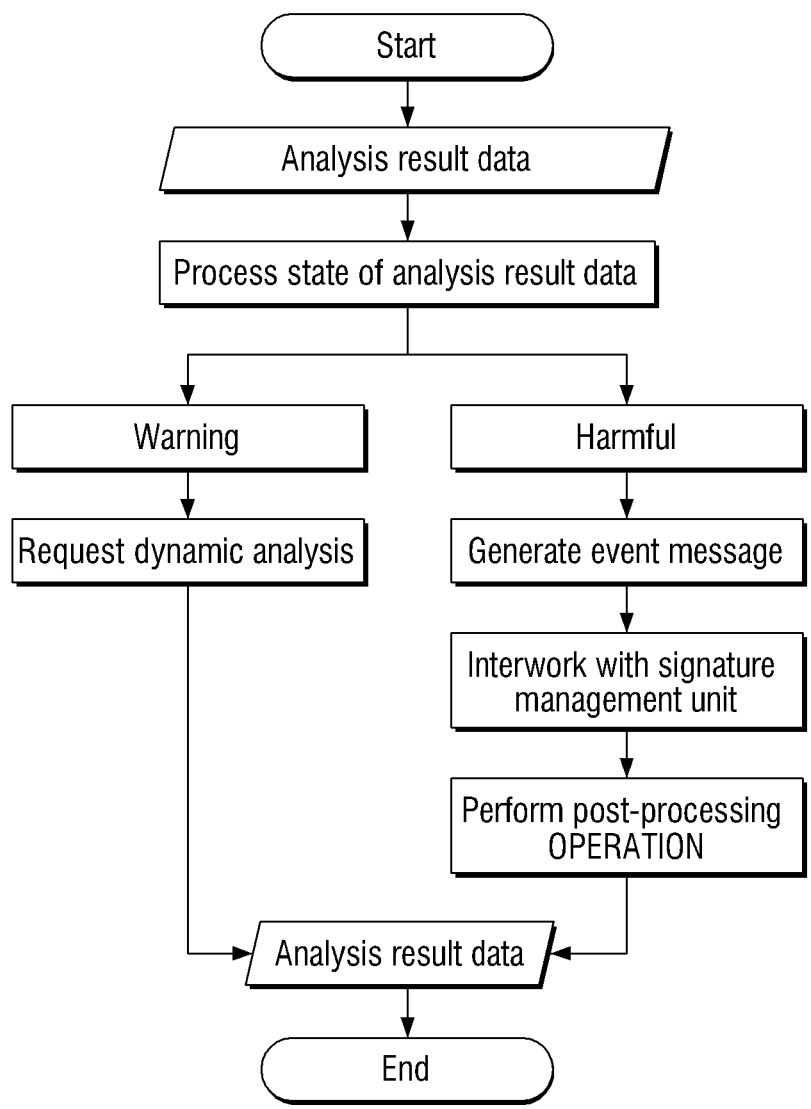
FIG. 16 is a flowchart illustrating an operation of an analysis result processing module included in the script processing unit.
Figure 17:
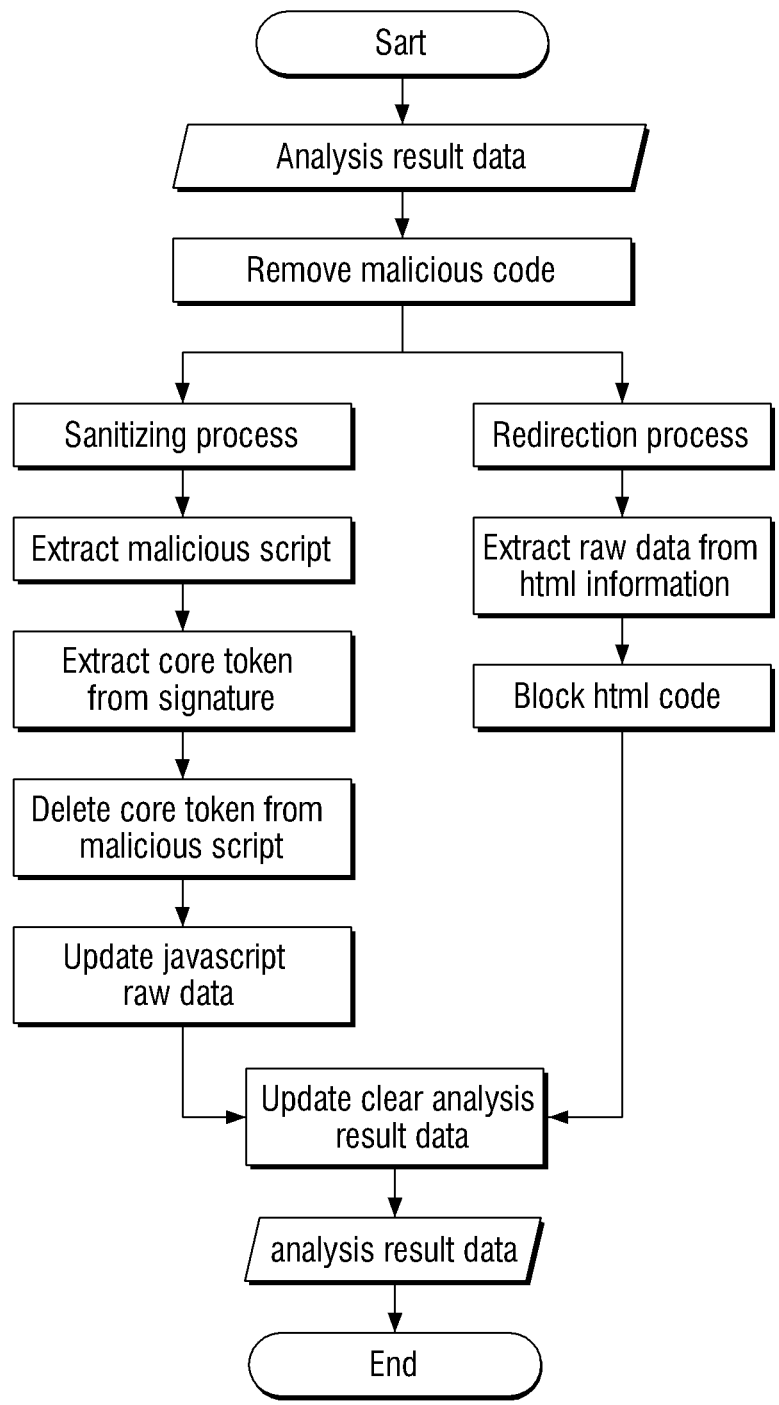
FIG. 17 is a flowchart illustrating an operation of a malicious code removal module included in the script processing unit.
Figure 18:
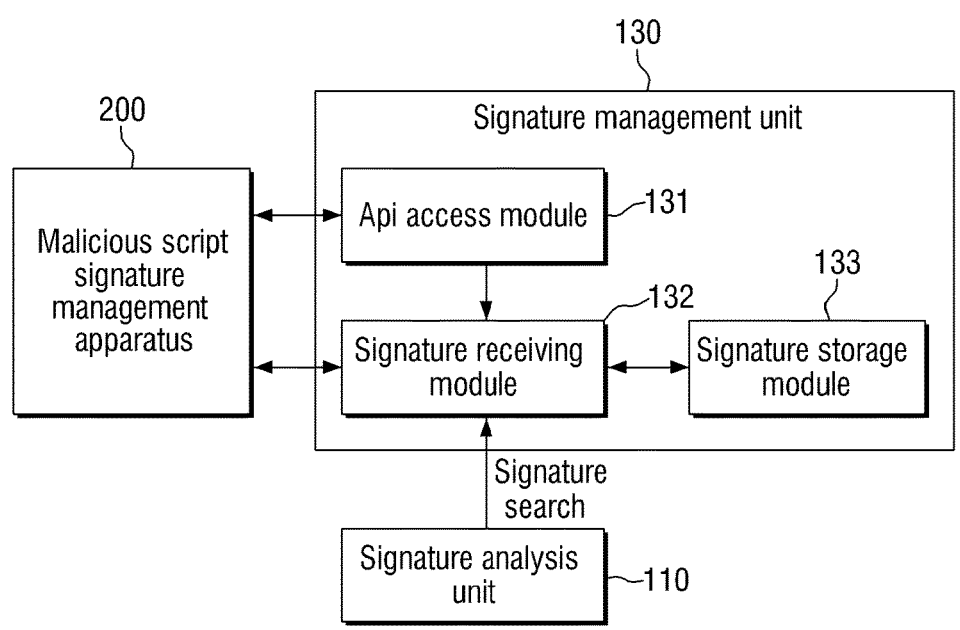
FIG. 18 is a block diagram of a script management unit illustrated in FIG. 1.
Figure 19:
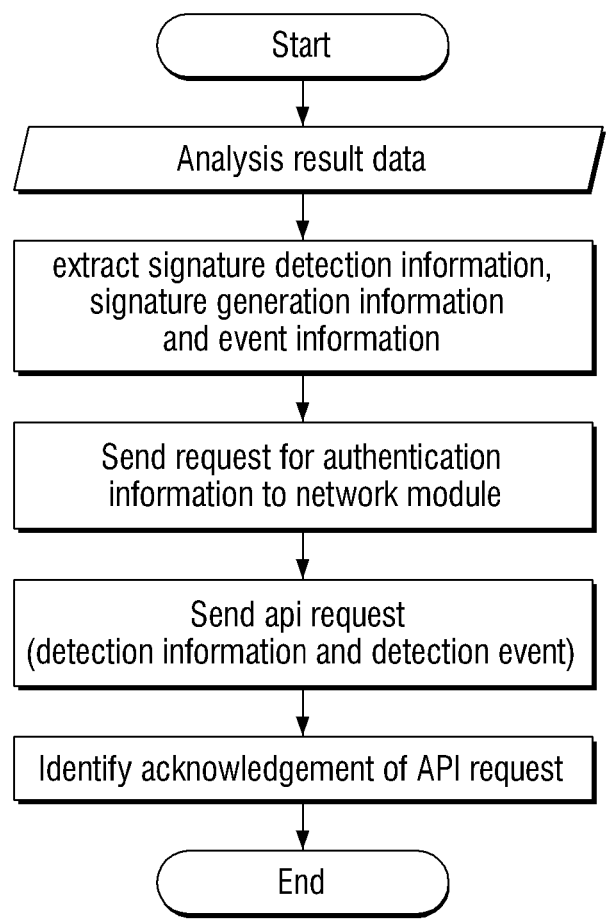
FIG. 19 is a flowchart illustrating an operation of the script management unit.

FIG. 1 is a block diagram of a system for detecting and preventing malicious scripts, according to an exemplary embodiment of the inventive concept. FIG. 2 is a block diagram of a static analysis unit illustrated in FIG. 1. FIG. 3 is a flowchart illustrating an operation of a pattern inspection module included in the static analysis unit. FIGS. 4 to 6 are flowcharts illustrating an operation of a code analysis module included in the static analysis unit. FIG. 7 is a flowchart illustrating an operation of a cumulative value comparison module included in the static analysis unit. FIG. 8 is a block diagram of a dynamic analysis unit illustrated in FIG. 1. FIG. 9 is a flowchart illustrating an operation of a call trace generation module included in the dynamic analysis unit. FIGS. 10 to 13 are diagrams illustrating the generation of an Application Programming Interface (API) trace and the Extensible Mark-up Language (XML) conversion of a call trace. FIG. 14 is a flowchart illustrating an operation of a call trace comparison module included in the dynamic analysis unit. FIG. 15 is a block diagram illustrating a script processing unit illustrated in FIG. 1. FIG. 16 is a flowchart illustrating an operation of an analysis result processing module included in the script processing unit. FIG. 17 is a flowchart illustrating an operation of a malicious code removal module included in the script processing unit. FIG. 18 is a block diagram of a script management unit illustrated in FIG. 1. FIG. 19 is a flowchart illustrating an operation of the script management unit.

Referring to FIG. 1, a system 1 (hereinafter, the malicious script detection/prevention system 1) according to an exemplary embodiment of the inventive concept, includes an apparatus 100 (hereinafter, the malicious script detection/prevention apparatus 100) for detecting and preventing malicious scripts, a malicious script signature management apparatus 200, and a network processing apparatus 300.

The malicious script detection/prevention system 1 uses malicious script information regarding malicious scripts detected by the malicious script detection/prevention apparatus 100 to allow the malicious script signature management apparatus 200 to generate and manage signatures. The signatures may be used in a network-level system for detecting and preventing malicious scripts or a host-level malicious script execution prevention software program or intrusion detection system to prevent malicious scripts. The inventive concept is directed to a system for detecting malicious scripts at a network level.

The term "signature", as used herein, indicates pattern information used for a script analysis engine to detect malicious scripts, and more particularly, an object with pattern information of previously-detected malicious scripts.

The malicious script detection/prevention apparatus 100 detects malicious scripts. More specifically, the malicious script detection/prevention apparatus 100 detects any malicious scripts from among Hyper-Text Mark-up Language (HTML) scripts and JavaScript scripts generated by the network processing apparatus 300. The malicious script detection/prevention apparatus 100 receives a signature from the malicious script signature management apparatus 200, detects any malicious scripts using the received signature, and provides the results of the detection to the malicious script signature management apparatus 200 so as for the results of the detection to be reflected in a signature to be generated. The malicious script detection/prevention apparatus 100 may detect any modified or polymorphic malicious scripts later using the signature with the results of the detection reflected thereinto.

Examples of analysis input data that can be input to the malicious script detection/prevention apparatus 100 include, for example, analysis type information, HTML information, JavaScript information, and metadata. The analysis type information includes information indicating whether the type of analysis requested is static analysis or dynamic analysis. The HTML information includes identifier (ID) information and Uniform Resource Identifier (URI) information of an HTML script. The JavaScript information includes ID information and URI information of a JavaScript script. The metadata includes ID information and Hyper-Text Transfer Protocol (HTTP) header information of the HTML or JavaScript script.

Examples of analysis output data that can be output from the malicious script detection/prevention apparatus 100 include, for example, analysis result data and metadata. The analysis result data includes state information, source ID/signature ID and detection time information of a detected malicious script. The metadata includes information regarding whether an obfuscated code exists in a JavaScript script.

The structures of the malicious script detection/prevention apparatus 100 and the malicious script signature management apparatus 200 will hereinafter be described with reference to FIGS. 1 to 19.

The malicious script detection/prevention apparatus 100 includes a script analysis unit 110, a script processing unit 120 and a signature management unit 130.

The script analysis unit 110 includes a static analysis unit 111 and a dynamic analysis unit 115. The static analysis unit 111 includes a pattern inspection module 112, a code analysis module 113 and a cumulative value comparison module 114. The dynamic analysis unit 115 may include a call trace generation module 116 and a call trace comparison module 117.

The static analysis unit 111 is provided to inspect scripts as quickly as possible using a first signature SN1. The static analysis unit 111 extracts a suspected malicious element primarily, and the dynamic analysis unit 115 detects a malicious script by inspecting the extracted suspected malicious element, and generates detection result data.

More specifically, the pattern inspection module 112 analyzes the code pattern of a first script SC1 using the first signature SN1, and generates first analysis result data AR1 including detection information and detection time information regarding the first script SC1. The first signature SN1 is a signature including code pattern information of previously-detected malicious scripts, may be defined as being a code pattern to be compared with a script to be subjected to static analysis, the first script SC1 may be defined as being a script to be subjected to static analysis, and a second script SC2 may be defined as being a script not matching the code pattern of the first signature SN1 and thus to be subjected to dynamic analysis.

The pattern inspection module 112 searches the signature management unit 130 for a signature and is thus provided with the first signature SN1. The pattern inspection module 112 analyzes the code pattern of the first script SC1 using the first signature SN1, and generates the first analysis result data AR1 based on the results of the analysis. The pattern inspection module 112 provides the first analysis result data AR1 to the script processing unit 120.

More specifically, referring to FIG. 3, the pattern inspection module 112 searches for a signature and analyzes the code pattern of the first script SC1 using the signature. In response to the inspection of the first script SC1 using the signature being failed, the pattern inspection module 112 searches for another signature and analyzes the code pattern of the first script SC1 again using the second signature. The pattern inspection module 112 generates the first analysis result data AR1, including location information, detection time information, signature ID information and JavaScript source ID information and state information of a malicious script code detected from the first script SC1, and provides the first analysis result data AR1 to the script processing unit 120.

The code analysis module 113 generates first detection result data DR1 regarding any HTML 5 tag detected from the first script SC1, second detection result data DR2 regarding any JavaScript API flow detected from the first script SC1, and third detection result data DR3 regarding a degree of obfuscation of the first script SC1.

More specifically, referring to FIG. 4, the code analysis module 113 searches for an HTML 5 tag from an HTML 5 tag storage, determines whether an HTML 5 tag is included in the first script SC1, and generates the first detection result data DR1 based on any HTML 5 tag detected from the first script SC1.

Referring to FIG. 5, the code analysis module 113 searches for a JavaScript API from a JavaScript storage, determines whether a JavaScript API flow is included in the first script SC1, and generates the second detection result data DR2 based on any JavaScript API flow detected from the first script SC1.

Referring to FIG. 6, the code analysis module 113 extracts a script code from the HTML information and the JavaScript information, determines a degree of obfuscation of the first script SC1 by inputting the extracted script code, and updates metadata and generates the third detection result data DR3 based on the results of the determination to indicate whether the first script SC1 has been obfuscated. The determination of the degree of obfuscation of the first script SC1 may be performed using N-Gram, Entropy, or Word Size.

The cumulative value comparison module 114 generates a cumulative value by applying a predetermined weight to each of the first detection result data DR1, the second detection result data DR2 and the third detection result data DR3, and generates second analysis result data AR2 by determining whether the cumulative value is greater than a predefined threshold value. More specifically, referring to FIG. 7, the cumulative value comparison module 114 calculates a weighted sum of the first detection result data DR1, the second detection result data DR2 and the third detection result data DR3 by applying a predetermined weight to each of the first detection result data DR1, the second detection result data DR2 and the third detection result data DR3, and updates the second analysis result data AR2 with malicious script detection information in response to the weighted sum of the first detection result data DR1, the second detection result data DR2 and the third detection result data DR3 being greater than the predetermined threshold value.

The dynamic analysis unit 115 is provided to detect a malicious script that the static analysis unit 111 fails to detect. The dynamic analysis unit 115 analyzes the call trace of the second script SC2 using a second signature SN2. The second signature SN2 is a signature including call trace information of previously-detected malicious scripts, and may be defined as being a call trace to be compared with a script to be subjected to dynamic analysis.

The dynamic analysis unit 115 may generate a call trace including API flow information regarding the second script SC2, receives the second signature SN2 from the signature management unit 130, and analyzes the generated call trace using the second signature SN2.

The call trace generation module 116 generates an API trace for the second script SC2 and generates a call trace by XML-converting the generated API trace.

More specifically, referring to FIG. 9, the call trace generation module 116 analyzes raw data of the HTML information and determines whether a script tag exists in the raw data of the HTML information and has an "External_ID". In response to the "External_ID" existing, the call trace generation module 116 extracts raw data of the JavaScript information, and analyzes the extracted raw data. The call trace generation module 116 identifies location information indicating a location on a script code where a hooked API is called, completes the analysis of the syntax of a JavaScript script and executes the syntax of the JavaScript script. During the execution of the syntax of the JavaScript script, the call trace generation module 116 controls the execution of a sandbox so as not to adversely affect a host, traces the name of the hooked API and input metadata, and connects the name of the hooked API and the input metadata with the location information. By using these information, the call trace generation module 116 generates the API trace generation information.

The call trace generation module 116 generates an API trace based on the API trace generation information, and generates a call trace by XML-converting the API trace, as illustrated in FIGS. 10 to 13. The second signature SN2 may have a structure obtained by removing a "Loc Node" from the structure illustrated in FIG. 13.

The call trace comparison module 117 extracts a sub-tree code from the call trace generated by the call trace generation module 116, analyzes the extracted sub-tree code using the second signature SN2, and generates third analysis result data AR3 including detection information and detection time information regarding the call trace generated by the call trace generation module 116. The term "sub-tree code", as used herein, indicates part of a call trace, generated from a stack-type JavaScript code, having a similar pattern to that of the second signature SN2. Since a JavaScript script is executed in sequence in a code in the form of a stack, the behaviors of a script code can be determined based on call trace information regarding the script code.

More specifically, referring to FIG. 14, the call trace comparison module 117 extracts a sub-tree code from a call trace, stores location information present in the "Loc Node" and determines a degree of similarity between the extracted sub-tree code and the second signature SN2. The call trace comparison module 117 determines whether the determined similarity level exceeds a predetermined threshold value, and generates the third analysis result data AR3 including signature ID information, JavaScript source ID information, detection time information, location information and state information, in response to the extracted sub-tree code being determined to be malicious. The call trace comparison module 117 performs these processes repeatedly to determine the similarity between a plurality of sub-tree codes and the second signature SN2.

The script processing unit 120 may include an analysis result processing module 121 and a malicious code removal module 122.

The analysis result processing unit 120 may generate an event message based on the first analysis result data AR1 and the second analysis result data AR2, which are provided by the script analysis unit 110, and provides the event message to the signature management unit 130. The analysis result processing unit 120 may request the script analysis unit 110 to conduct dynamic analysis according to the first analysis result data AR1 and the second analysis result data AR2.

More specifically, referring to FIG. 16, the analysis result processing unit 120 requests the script analysis unit 110 to conduct dynamic analysis in response to the first analysis result data AR1 and the second analysis result data AR2 indicating a "warning" state. Alternatively, in response to the analysis result data AR1 and the second analysis result data AR2 indicating a "harmful" state, the analysis result processing unit 120 generates an event message, transmits the event message to the signature management unit 130, and performs a post-processing operation with the aid of the malicious code removal module 122.

The malicious code removal module 122 removes a malicious JavaScript script included in the first script SC1 or blocks a malicious HTML code included in the first script SC1.

More specifically, referring to FIG. 17, the malicious code removal module 122 removes or blocks a malicious code upon request by the analysis result processing unit 120. In response to a "sanitizing" request being received from the analysis result processing unit 120, the malicious code removal module 122 extracts a malicious script code from detected JavaScript information, extracts a core token code from the second signature SN2, deletes the core token code from the extracted malicious script code and updates raw data of the detected JavaScript information accordingly.

In response to a "redirection" request being received from the analysis result processing unit 120, the malicious code removal module 122 extracts raw data of detected HTML information, blocks a corresponding HTML code, and updates the raw data of the detected HTML information accordingly.

The signature management unit 130 may include an API access module 131, a signature receiving module 132 and a signature storage module 133.

The API access module 131 receives signature detection information, signature generation information and event information from the script processing unit 120, and sends a request for authentication information, which is used to call an API, to the signature receiving module 132. The API access module 131 provides the signature detection information, the signature generation information and the event information while interworking with the malicious script signature management apparatus 200.

The signature receiving module 132 receives signature update information and signature search information from the signature storage module 133 according to the request for the authentication information. The signature receiving module 132 provides the signature update information and the event information while interworking with the malicious script signature management apparatus 200. The signature receiving module 132 receives a signature search request from the script analysis unit 110.

The signature storage module 133 stores the signature update information and the signature search information therein.

More specifically, referring to FIG. 19, the signature management unit 130 extracts the signature detection information, the signature generation information and the event information from the first analysis result data AR1, the second analysis result data AR2, and the third analysis result data AR3, sends a request for the authentication information to a network module, generates and transmits requested data according to an API request. The signature management unit 130 identifies an acknowledgement of the API request.

Referring back to FIG. 1, the malicious script signature management apparatus 200 generates and manages the second signature SN2. The malicious script signature management apparatus 200 generates the second signature SN2 through a signature generation unit 210, and manages the second signature SN2 and provides the second signature SN2 to the malicious script detection/prevention apparatus 100 through a signature distribution/management unit 220. The second signature Sn2 includes behavior information of malicious scripts, and may be used for the malicious script detection/prevention apparatus 100 to perform dynamic analysis on a JavaScript script.

The network processing apparatus 300 receives a JavaScript script from an Internet browser or a content server, provides the received JavaScript script to the malicious script detection/prevention apparatus 100, and sends a request for the analysis of the received JavaScript for the detection/prevention of a malicious script to the malicious script detection/prevention apparatus 100. The network processing apparatus 300 manages settings regarding the analysis engine of the malicious script detection/prevention apparatus 100. The network processing apparatus 300 receives analysis result data from the malicious script detection/prevention apparatus 100 and provides the analysis result data to the Internet browser or the content server.

Figure 20:
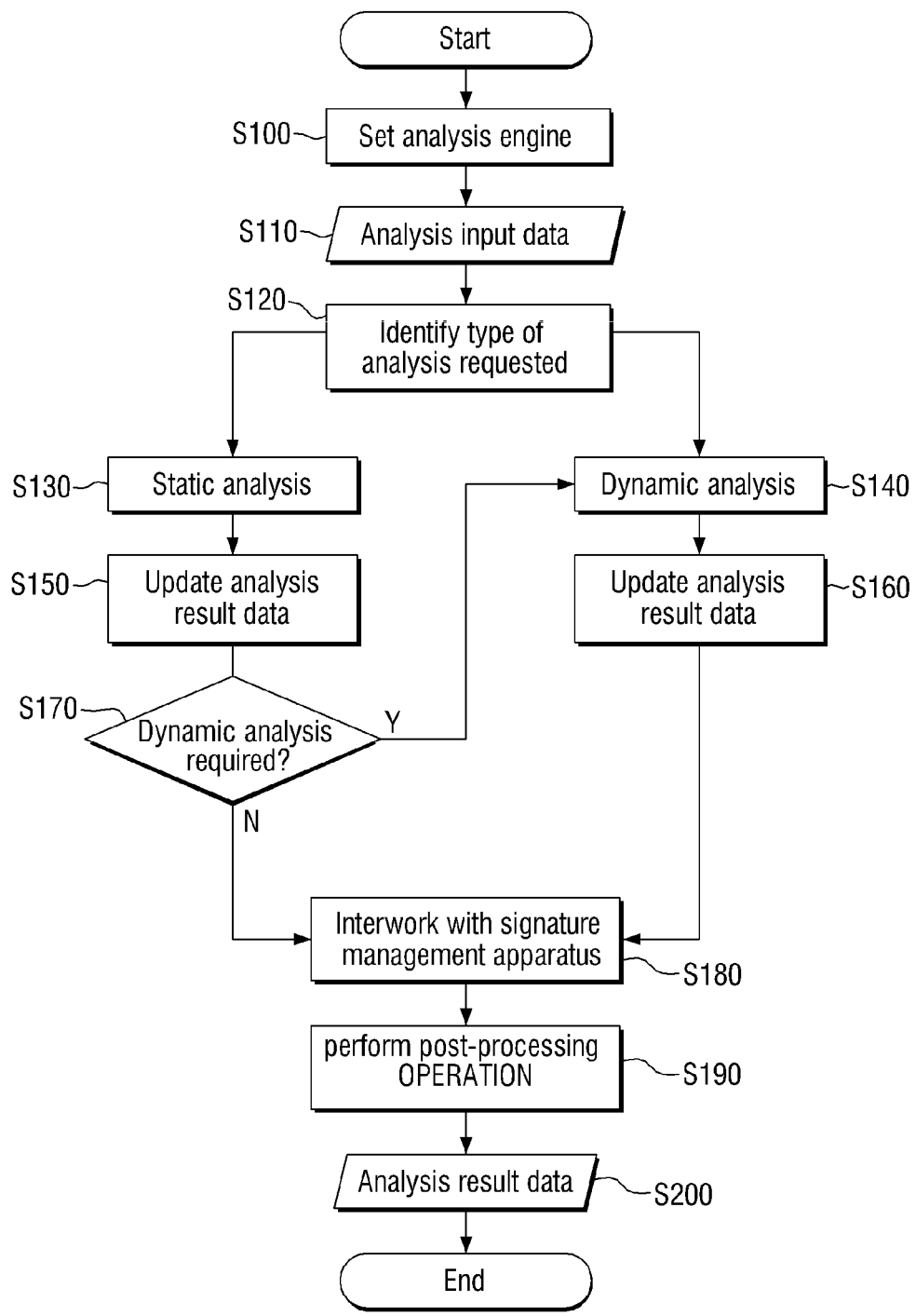
FIG. 20 is a flowchart illustrating a method of detecting malicious scripts, according to an exemplary embodiment of the inventive concept.

FIG. 20 is a flowchart illustrating a method of detecting malicious scripts, according to an exemplary embodiment of the inventive concept.

Referring to FIG. 20, an initial value is set for the malicious script detection/prevention apparatus 100 (S100), and analysis input data is received (S110).

The analysis input data may include, for example, analysis type information, HTML information, JavaScript information, and metadata. The analysis type information includes information indicating whether the type of analysis requested is static analysis or dynamic analysis. The HTML information includes ID information and URI information of an HTML script. The JavaScript information includes ID information and URI information of a JavaScript script. The metadata includes ID information and HTTP header information of the HTML or JavaScript script.

Thereafter, the type of analysis requested is identified by extracting the analysis type information from the analysis input data (S120).

Thereafter, static analysis or dynamic analysis is performed on a script according to the identified type of analysis (S130 and S140).

Static analysis is a method of analyzing a script using the first signature SN1, which includes code pattern information of previously-detected malicious scripts, and dynamic analysis is a method of analyzing a script using the second signature SN2, which includes a call trace having API flow information of the previously-detected malicious scripts. Dynamic analysis may be performed on the second script SC2, which accounts for part of the first script SC1 not matching the first signature SN1.

Thereafter, analysis result data is updated with the results of static analysis (S150) or with the results of dynamic analysis (S160).

Thereafter, a determination is made as to whether dynamic analysis is needed based on the results of static analysis (S170). In response to a determination being made that dynamic analysis is needed, dynamic analysis is performed.

Thereafter, a post-processing operation to be performed is determined by interworking with the malicious script signature management apparatus 200 (S180), and the post-processing operation is performed (S190). The post-processing operation encompasses removing or blocking a script determined to be malicious.

Thereafter, analysis result data is generated as output data (S200).

The steps and/or actions of a method or algorithm described in connection with the aspects disclosed herein may be embodied directly in hardware, in a software module executed by a processor, or in a combination of the two. A software module may reside in a RAM memory, flash memory, a ROM memory, an EPROM memory, an EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

While the inventive concept has been particularly shown and described with reference to exemplary embodiments thereof, it will be understood by those of ordinary skill in the art that various changes may be made therein without departing from the spirit and scope of the inventive concept as defined by the following claims. The exemplary embodiments should be considered in a descriptive sense only and not for purposes of limitation.

What is claimed is:

1. An apparatus for detecting and preventing malicious scripts, comprising:
   a signature management unit managing a first signature including code pattern information of previously-detected malicious scripts;
   a script analysis unit receiving the first signature from the signature management unit and analyzing a first script, which is included in a web page, using the first signature; and
   a script processing unit receiving analysis result data from the script analysis unit and processing the first script according to the analysis result data,
   wherein the script analysis unit includes a static analysis unit and a dynamic analysis unit, the static analysis unit analyzes a code pattern of the first script using the first signature and provides a second script, which is part of the first script not matching the first signature, to the dynamic analysis unit, and the dynamic analysis unit generates a first call trace including Application Programming Interface (API) flow information for the second script, receives a second signature including a second call trace of the previously-detected malicious scripts, and analyzes the first call trace using the second signature, and wherein the dynamic analysis unit includes a call trace generation module and the call trace generation module generates an API trace for the second script and generates the first call trace by Extensible Mark-up Language (XML)-converting the generated API trace.

2. The apparatus of claim 1, wherein the static analysis unit includes a pattern inspection module and the pattern inspection module analyzes the code pattern of the first script using the first signature and generates first analysis result data including detection information and detection time information regarding the first script.

3. The apparatus of claim 2, wherein the static analysis unit further includes a code analysis module and the code analysis module generates first detection result data regarding any Hyper-Text Mark-up Language (HTML) 5 tag detected from the first script, second detection result data any JavaScript API flow detected from the first script, and third detection result data regarding a degree of obfuscation of the first script.

4. The apparatus of claim 3, wherein the static analysis unit further includes a cumulative value comparison module and the cumulative value comparison module generates a cumulative value by applying a predetermined weight to each of the first detection result data, the second detection result data and the third detection result data, and generates second analysis result data by determining whether the cumulative value is greater than a predefined threshold value.

5. The apparatus of claim 1, wherein the dynamic analysis unit further includes a call trace comparison module and the call trace comparison module extracts a sub-tree code from the first call trace, analyzes the extracted sub-tree code using the second signature, and generates third analysis result data including detection information and detection time information regarding the first call trace.

6. The apparatus of claim 1, wherein the script processing unit includes an analysis result processing module and a malicious code removal module, the analysis result processing module generates an event message according to the analysis result data and provides the event message to the signature management unit, and the malicious code removal module removes a malicious script from the first script.

7. The apparatus of claim 6, wherein the analysis result processing module sends a request for dynamic analysis to the script analysis unit according to the analysis result data.

8. The apparatus of claim 6, wherein the malicious code removal module removes a malicious JavaScript script included in the first script and blocks a malicious HTML code included in the first script.

9. The apparatus of claim 1, wherein the signature management unit includes an API access module, a signature receiving module and a signature storage module, the API access module sends a request for authentication information, which is used to call an API, to the signature receiving module, the signature receiving module receives signature update information from the signature storage unit according to the request for the authentication information, and the signature storage module stores the signature update information and signature search information therein.

10. A system for detecting and preventing malicious scripts, comprising:

an apparatus for detecting and preventing malicious scripts, analyzing a first script, which is included in a web page, using a first signature or a second signature to determine whether a malicious script exists in the first script, and processing the first script according to analysis result data obtained by the analysis; and a signature management apparatus generating and managing the first signature or the second signature and providing the first signature or the second signature to the apparatus for detecting and preventing malicious scripts upon request, wherein the first signature includes code pattern information of previously-detected malicious scripts, the second signature includes a call trace, which has API flow information of the previously-detected malicious scripts, and the apparatus for detecting and preventing malicious scripts primarily performs static analysis on the first script using the first signature and secondarily performs dynamic analysis on the first script using the second signature, wherein the apparatus for detecting and preventing malicious scripts includes a signature management unit, a script analysis unit and a script processing unit, the signature management unit manages the first signature or the second signature, the script analysis unit includes a static analysis unit and a dynamic analysis unit, the static analysis unit performs the static analysis using the first signature, the dynamic analysis unit performs the dynamic analysis using the second signature, and the script processing unit receives the analysis result data from the script analysis unit and processes the first script according to the analysis result data, and wherein the static analysis unit includes a pattern inspection module and a code analysis module, the pattern inspection module analyzes a code pattern of the first script using the first signature, provides a second script, which is part of the first script not matching the first signature, to the dynamic analysis unit, and generates first analysis result data including detection information and detection time information regarding the first script, and the code analysis module generates first detection result data regarding any HTML 5 tag detected from the first script, second detection result data regarding any JavaScript API flow detected from the first script, and third detection result data regarding a degree of obfuscation of the first script, and wherein the dynamic analysis unit includes a call trace generation module and a call trace comparison module, the call trace generation module generates an API trace for the second script and generates a first call trace by XML-converting the generated API trace, and the call trace comparison module extracts a sub-tree code from the first call trace, analyzes the extracted sub-tree code using the second signature, and generates third analysis result data including detection information and detection time information regarding the first call trace.

11. The system of claim 10, wherein the static analysis unit further includes a cumulative value comparison module generates a cumulative value by applying a predetermined weight to each of the first detection result data, the second detection result data and the third detection result data, and generates second analysis result data by determining whether the cumulative value is greater than a predefined threshold value.

12. The system of claim 10, wherein the script processing unit includes an analysis result processing module and a malicious code removal module, the analysis result processing module generates an event message according to the analysis result data and provides the event message to the signature management unit, and the malicious code removal module removes a malicious script from the first script.

13. The system of claim 12, wherein the analysis result processing module sends a request for the dynamic analysis to the script analysis unit according to the analysis result data.

14. The system of claim 12, wherein the malicious code removal module removes a malicious JavaScript script included in the first script and blocks a malicious HTML code included in the first script.

15. The system of claim 10, wherein the signature management unit includes an API access module, a signature receiving module and a signature storage module, the API access module sends a request for authentication information, which is used to call an API, to the signature receiving module, the signature receiving module receives signature update information from the signature storage unit according to the request for the authentication information, and the signature storage module stores the signature update information and signature search information therein.

16. A method of detecting and preventing malicious scripts, comprising:
    receiving analysis input data;
    extracting analysis type information from the analysis input data;
    performing static analysis or dynamic analysis on a first script, which is included in a web page, according to the extracted analysis type information;
    updating analysis result data according to results of the static analysis or the dynamic analysis; and
    removing or blocking the first script according to the results of the static analysis or the dynamic analysis,
    wherein the performing the static analysis or the dynamic analysis, comprises performing the static analysis on the first script using a first signature including code pattern information of previously-detected malicious scripts, or performing the dynamic analysis on the first script using a second signature including a call trace having API flow information of the previously-detected malicious scripts,
    wherein the performing the dynamic analysis on the first script, comprises performing the dynamic analysis on a second script, which is part of the first script not matching the first signature, and
    wherein the performing the dynamic analysis on the second script, comprises generating an API trace for the second script, generating a first call trace by XML-converting the generated API trace, extracting a sub-tree code from the first call trace and analyzing the extracted sub-tree code using the second signature.

17. The method of claim 16, wherein the removing or blocking the first script, comprises removing a malicious JavaScript script included in the first script or blocking a malicious HTML code included in the first script.

* * * * *